Dec. 15, 1953            C. E. HENRY            2,662,329
CASTING ROD
Filed Feb. 21, 1952                                               2 Sheets-Sheet 1
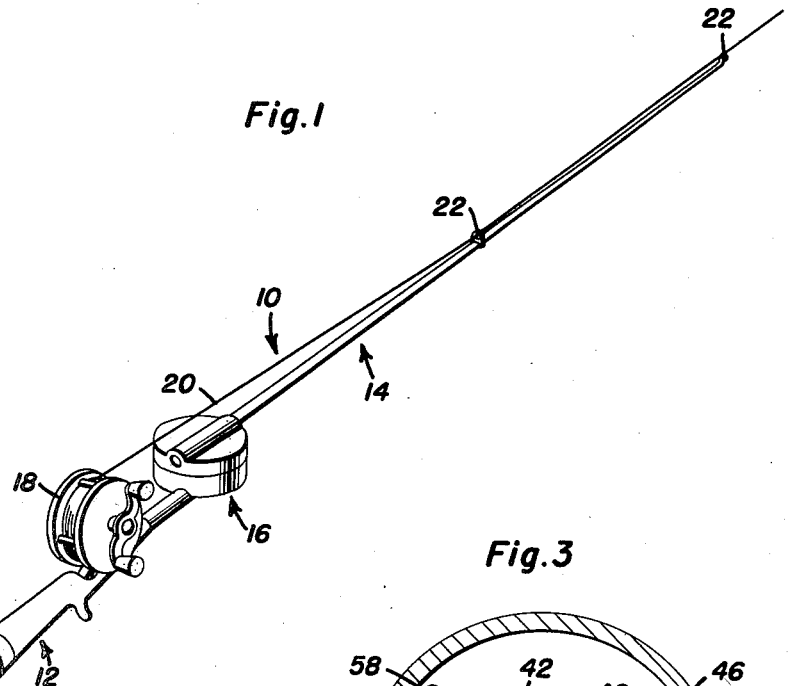
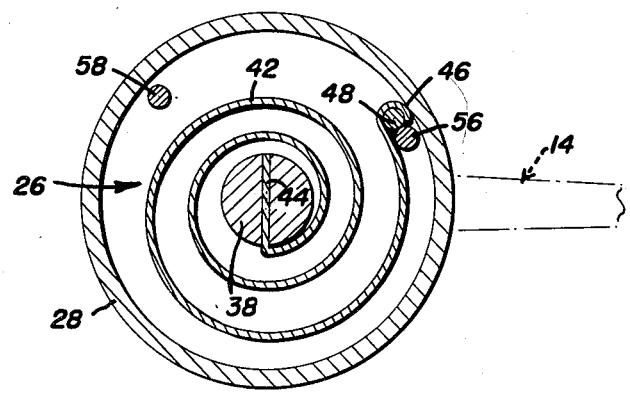
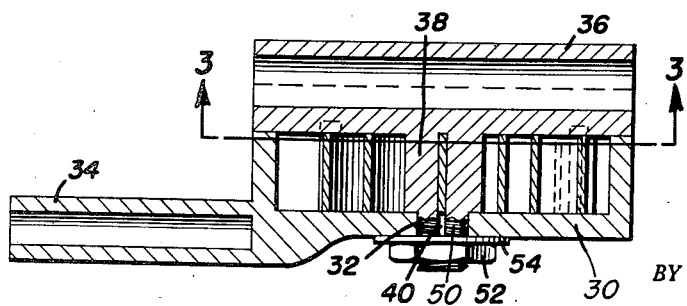
Clyde E. Henry
INVENTOR.

Dec. 15, 1953  C. E. HENRY  2,662,329
CASTING ROD

Filed Feb. 21, 1952 2 Sheets-Sheet 2

Clyde E. Henry
*INVENTOR.*

Patented Dec. 15, 1953

2,662,329

UNITED STATES PATENT OFFICE 2,662,329

CASTING ROD

Clyde E. Henry, Nevada, Mo.

Application February 21, 1952, Serial No. 272,748

6 Claims. (Cl. 43—19)

1

This invention relates generally to a casting rod, and more particularly to a casting rod having spring means for mechanical casting.

Many fishermen who fish along stream banks find places where the fishing conditions would be ideal except for the fact that the banks are so bushy that it is impossible to cast in order to place the lure or bait in the desired portion of the stream. Also, every fisherman knows the danger of a person casting in cramped quarters among other fishermen. This is especially true in the case of an ideal fishing location which is extremely crowded and wherein one fisherman is liable to hook another in the process of casting. A similar situation exists in a small boat with several occupants.

The primary object of this invention is to provide an improved casting rod with which a fishing line and its accompanying bait or lure may be cast to its desired position without endangering other nearby fishermen.

Another object of this invention is to provide an improved casting rod which has a built-in spring action whereby the length of the rod may be greatly reduced, said reduction in length will enable the fisherman to more easily cast in crowded quarters.

Another object of this invention is to provide an improved casting rod having a built-in spring mechanism facilitating casting, said casting rod being of simple and compact construction whereby it may be conveniently and economically manufactured.

Another object of this invention is to provide an improved torsion spring mechanism adapted to be mounted between the handle and rod portion of a conventional fishing rod generally utilized for casting purposes.

A further object of this invention is to provide an improved casting rod in which the rod portion is pivotally mounted with respect to the handle portion and has a spring mechanism incorporated therein, whereby said rod portion may be pivoted to a position out of alignment with the handle portion and at the same time pressing the spring mechanism so that when the rod portion is released it is sprung back into alignment with the handle portion with the result being the casting of the line and bait.

With these objects definitely in view, this invention resides in certain novel features of construction, combination and arrangement of elements and portions which will be hereinafter described in detail in the specification, particularly pointed out in the appended claims, and

2 illustrated in the accompanying drawings which form a material part of this specification, and in which:

Figure 1 is a perspective view of a casting rod having mounted therein a spring mechanism for permitting the rod portion of the casting rod to be pivoted out of alignment with the handle portion and against the pressure exerted thereon by the spring mechanism;

Figure 2:
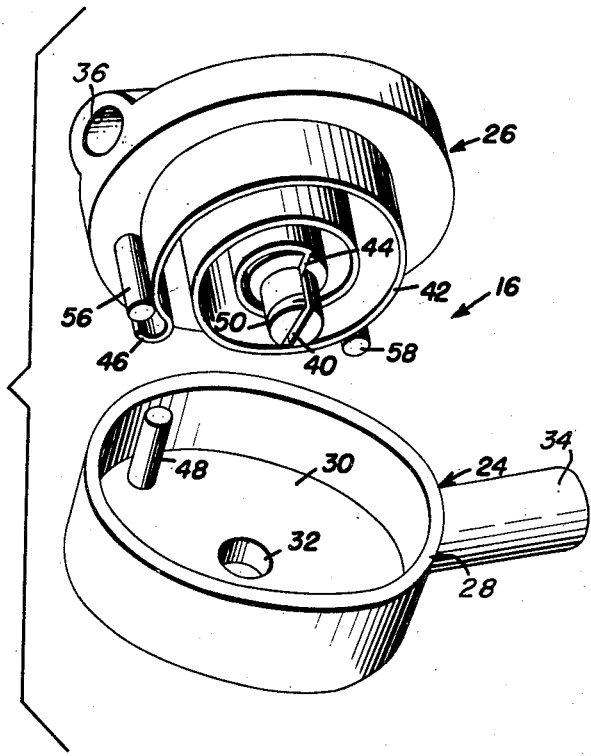
Figure 2 is an exploded perspective view on an enlarged scale of the spring mechanism incorporated in the casting rod of Figure 1.
Figure 5:
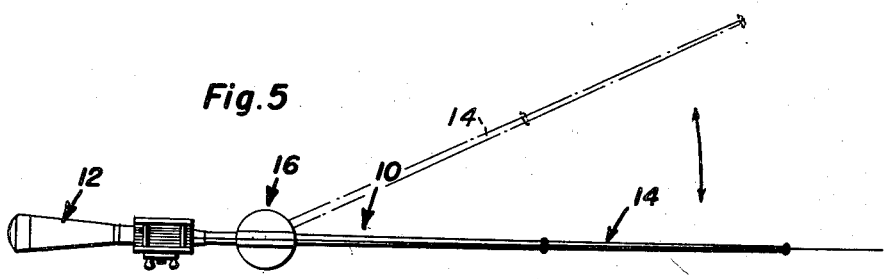

Figure 3 is a transverse horizontal sectional view taken substantially on the plane indicated by the section line 3—3 of Figure 4 and showing the relationship of a torsion spring mounted within the spring mechanism housing, a portion of the rod portion of the casting rod of Figure 1 being shown in broken lines in order to indicate the relationship of the various portions of the spring mechanism with respect to the other elements of the casting rod;

Figure 4 is a longitudinal transverse sectional view taken substantially on the plane through the center of the spring mechanism illustrated in Figure 2 and showing the internal construction thereof; and Figure 5 is a top plan view of the casting rod of Figure 1 and shows a pivoted position of the rack portion in broken lines, the broken line position of the rod portion being the position of the rod portion transpired to its release in the process of mechanical casting.

Similar characters of reference designate similar or identical elements or portions throughout the specification and throughout the different views of the drawings.

Referring now to the drawings in detail, it will be seen as illustrated in Figure 1 the improved casting rod, which is the subject of this invention, said casting rod being referred to in general by the reference numeral 10. The casting rod 10 includes a handle portion 12, a rod portion 14, and a spring mechanism 16 pivotally connecting said rod portion 14 with the handle portion 12.

The handle portion 12 is of the conventional fishing rod handle and has mounted thereon a conventional reel mechanism 18 on which is wound a fishing line 20. The rod portion 14 is a short type of a conventional fishing rod and may be formed of bamboo, or a laminated wood, metal or any other suitable material. The rod portion 14 has mounted thereon at spaced intervals a plurality of fishing line guides 22.

Referring now to Figure 2 particularly, it will be seen that the spring mechanism 16 includes a cup shaped housing 24 and a cover plate 26 for said housing.

The cup shaped housing 24 has a substantially cylindrical side wall 28 and a flat bottom wall 30. The flat bottom wall 30 is provided with a centrally located opening 32 the purpose of which will be explained in more detail hereinafter. A rearwardly extending shaft 34 is secured to the side wall 28 and partially overlies the bottom 30.

Referring now to Figures 2 and 4 in particular, it will be seen that the cover plate 26 has a diametrically extending sleeve 36 integral with the upper side thereof. Extending from the lower side of the cover plate 26 is an integral centrally located boss 38 having a diametral slot 40 therein. Secured to the cover plate 26 is a flat torsion spring 42 having an end 44 offset from the spiral portion thereof and received within the slot 40. The beveled end of the torsion spring 42 is in the form of a hook 46 which is adapted to hook behind a pin 48 extending upwardly from the bottom 30 of the housing 24.

The centrally located boss 38 is provided with a reduced threaded extension 50 which is passed through the opening 32 in the bottom 30 of the housing 24 and secured therein by a nut 52 threadedly engaged thereon. Disposed between the nut 52 and the under surface of the bottom 30 is a flat washer 54.

Referring now to Figure 3 in particular, it will be seen that the hook end portion 46 of the torsion spring 42 is hooked around the pin 48 with the torsion spring merging the pin 48 in a clockwise direction. The cover plate 26 is provided with a first stop pin 56 for engaging the pin 48 of the housing 24 to prevent clockwise rotation thereof and maintain the axis of the shaft 34 and the sleeve 36 in alignment. The cover plate 26 is also provided with a second stop pin 58 which is disposed approximately 90 degrees from the stop pin 56 and is intended to limit the counterclockwise rotation of the housing 24 with respect to the cover plate 26.

Referring now to Figure 5 in particular, it will be seen that due to the engagement of the pin 48 with the first stop pin 56, the handle portion 12 and the rod portion 14 of the casting rod pin are normally in alignment. When it is desired to utilize the casting rod 10 for the purpose of mechanical casting, the rod portion 14 is pivoted counterclockwise, as viewed in Figure 5, against the pressure of the torsion spring 42. After the rod portion 14 has been pivoted the desired amount, the rod portion is suddenly released with the result that it moves clockwise to its normal position in alignment with the handle portion 12. A sudden motion imparted to the fishing line 20 and its associated bait or lure (not shown) is sufficient to cast the bait or lure and the end portion of the fishing line a considerable distance. As it is readily apparent that the distance with which the fishing line and its associated bait is cast, is directly proportional to the angle to which the rod portion 14 is pivoted prior to its release, and to the angle of elevation.

The primary object of the second stop pin 58 is to engage the pin 48 and limit the clockwise pivoting of the rod portion 14, as viewed in Figure 5. By limiting the angle of rotation of the rod portion 14, it is impossible to brake the torsion spring under normal conditions.

Due to the use of the spring mechanism 16 between the handle portion 12 and the rod portion 14, the casting rod 10 is provided with sufficient spring to provide the desired casting qualities with a short rod portion 14. It has been found that a rod portion 14 about 18 inches in length is very satisfactory. When compared with rod lengths of four or more feet, which are usually required in casting, it is obvious that the casting rod 10 may be utilized in close quarters where casting with an ordinary fishing rod would be impossible.

The improved casting rod, which is the subject of this invention, is designed primarily for mechanical casting utilizing the pressure exerted by a torsion spring, it is not intended to so limit the invention. In spite of the short length of the rod portion of the casting rod, the improved casting rod can be used for ordinary casting or retrieving as you get the same spring action out of the spring mechanism as you would from an ordinary rod.

It is intended that the spring mechanism 16 may be utilized with any conventional casting rod in which the rod portion fits within a tubular sleeve or socket portion of the handle. It is intended that the rod portion 14 be tightly received within the sleeve 36 secured to the upper face of the cover plate 26 of the spring mechanism 16. Furthermore, it is intended that the shaft 34 extending rearwardly from the spring mechanism 16 may be received within a conventional socket at the forward end of the handle portion 12.

While the casting rod has been illustrated and described with the torsion spring 42 mounted in such a manner, so as to limit the casting rod to one whose rod portion 14 is normally held in the left hand, it is not intended to limit the invention. It is readily apparent that the torsion spring 42 and its associated pins 48, 56 and 58 may be equally as well arranged to present a casting rod whose rod portion 14 may be held in the right hand.

The operation of this casting rod will be understood from the foregoing description of the mechanical details thereof, taken in connection with the above recited objects and the drawings. Further description will appear to be unnecessary.

Minor modifications of the casting rod, varying in minor details from the embodiment of the casting rod illustrated and described here, may be resorted to without departure from the spirit and the scope of this invention, as defined in the appended claims.

Having described the invention, what is claimed as new is:

1. A spring mechanism for a casting rod comprising a cup shaped housing having a tubular extension for receiving a handle, a plate forming a cover for said housing, said plate having a torsion spring mounted thereon, a pin carried by said housing, said torsion spring being received within said housing and having an end hooked about said pin, means securing said cover to said housing for independent rotation, a tubular extension on said plate for receiving an inner end of a rod, and stop pins carried by said plate for engagement with said first mentioned pin and said one end of said spring to limit rotation of said plate.

2. A spring mechanism for a casting rod comprising a cup-shaped housing having a tubular extension for receiving a handle, a plate forming a cover for said housing, said plate having a torsion spring mounted thereon, a pin carried by said housing, said torsion spring being received within said housing and having an end hooked about said pin, means securing said cover to said housing for independent rotation, a tubular extension on said plate for receiving an inner end of a rod, and stop pins carried by said plate for engagement with said first mentioned pin and said one end of said spring to limit rotation of said plate, said means including a central boss on said plate having fastening means at the other end thereof, said torsion spring having a second end thereof secured to said boss, said boss being concentric with said spring.

3. A casting rod comprising a handle having a cup-shaped housing mounted at the outer end thereof, a closure plate overlying said housing and closing the same, said plate having a rod portion carried thereby, means rotatably securing said plate to said housing, a torsion spring carried by said housing and disposed within said housing, a pin carried by said housing, one end of said torsion spring being hook-shaped and engaging said pin, means connecting a second end of said spring to said plate, and stop pins carried by said plate on opposite sides of said first mentioned pin and said one end of said torsion spring to limit rotation of said plate and said rod portion relative to said housing and said handle.

4. A casting rod comprising a handle having a cup-shaped housing mounted at the outer end thereof, a closure plate overlying said housing and closing the same, said plate having a rod portion carried thereby, means rotatably securing said plate to said housing, a torsion spring carried by said housing and disposed within said housing, a pin carried by said housing, one end of said torsion spring being hook-shaped and engaging said pin, and stop pins carried by said plate on opposite sides of said first mentioned pin and said one end of said torsion spring to limit rotation of said plate and said rod portion relative to said housing and said handle, said means including a central boss on said plate having fastening means at the other end thereof, said torsion spring having a second end thereof secured to said boss, said boss being concentric with said spring.

5. A casting rod comprising a rod portion and a handle portion, the rod portion being pivotally connected to said handle portion, a torsion spring urging said rod portion into axial alignment with said handle portion, said handle portion having a cup shaped housing carried at one end of said handle portion, said torsion spring being mounted within said cup shaped housing, said housing having a pin engaging one end of said spring, a plate rigidly connected to said rod portion, and a central boss on said plate adapted to receive the other end of said spring and being rigidly secured thereto, said plate forming the cover of said cup shaped housing, said plate being provided with a first pin for aligning said handle portion and said rod portion, and a second pin for limiting the pivoting of said rod portion.

6. A casting rod comprising a cup-shaped housing having a tubular extension for receiving a handle, a plate seated on said housing and forming a cover for said housing, said plate having an integral sleeve for receiving an inner end of a rod, a torsion spring mounted within said housing, and a pin carried by said housing, said spring having a hook-shaped end engaged with said pin, said plate having a central boss, said spring surrounding said boss and having an opposite end secured to said boss, said plate being pivotally connected to said housing, said spring urging said sleeve into axial alignment with said tubular extension, said plate being provided with a first pin for aligning said tubular extension and said sleeve, and a second pin for limiting pivoting of said plate.

CLYDE E. HENRY.

References Cited in the file of this patent

UNITED STATES PATENTS

| Number | Name | Date |
|---|---|---|
| 180,644 | Sabin | Aug. 1, 1876 |
| 1,962,232 | Clairon | June 12, 1934 |
| 2,461,356 | Sus et al. | Feb. 8, 1949 |
| 2,482,999 | Bean | Sept. 27, 1949 |